(12) United States Patent
Lachnitt et al.

(10) Patent No.: US 10,439,423 B2
(45) Date of Patent: Oct. 8, 2019

(54) INTEGRATION DEVICE

(71) Applicant: Peiker Acustic GmbH & Co. KG, Friedrichsdorf (DE)

(72) Inventors: Jens Lachnitt, Alsfeld (DE); Markus Bohrmann, Frankfurt am Main (DE)

(73) Assignee: Peiker Acustic GmbH & Co. KG, Friedrichsdorf (DE)

( * ) Notice: Subject to any disclaimer, the term of this patent is extended or adjusted under 35 U.S.C. 154(b) by 432 days.

(21) Appl. No.: 15/071,548

(22) Filed: Mar. 16, 2016

(65) Prior Publication Data

US 2016/0276866 A1 Sep. 22, 2016

(30) Foreign Application Priority Data

Mar. 17, 2015 (DE) .................. 10 2015 003 319
Jul. 24, 2015 (DE) .................. 10 2015 112 127

(51) Int. Cl.

| *H02J 7/00* | (2006.01) |
|---|---|
| *H02J 7/02* | (2016.01) |
| *H02J 50/10* | (2016.01) |
| *H04M 1/04* | (2006.01) |
| *H04B 5/00* | (2006.01) |
| *H04M 1/60* | (2006.01) |

(52) U.S. Cl.
CPC ............ *H02J 7/025* (2013.01); *H02J 7/0044* (2013.01); *H02J 50/10* (2016.02); *H04M 1/04* (2013.01); *H04B 5/0025* (2013.01); *H04M 1/6075* (2013.01)

(58) Field of Classification Search
CPC .............. B60C 23/0483; B60C 23/045; G05D 2201/0213; G05D 1/0248; G08G 1/143; G08G 1/20; Y02D 70/1242; A61B 5/053; A61B 5/0533; H02J 50/10; H02J 7/0044; H02J 7/025
USPC .................................................. 320/106–115
See application file for complete search history.

(56) References Cited

U.S. PATENT DOCUMENTS

| 8,238,984 B2 | 8/2012 | Pursche et al. | |
|---|---|---|---|
| 2007/0139216 A1* | 6/2007 | Breed ................... | G08C 17/00 340/13.24 |
| 2008/0284575 A1* | 11/2008 | Breed ................. | B60C 23/0493 340/438 |
| 2011/0199047 A1* | 8/2011 | Fujii ....................... | B60L 1/04 320/109 |

(Continued)

FOREIGN PATENT DOCUMENTS

| DE | 10 2012 013 720 A1 | 1/2014 |
|---|---|---|
| DE | 10 2013 218 482 A1 | 3/2014 |

(Continued)

OTHER PUBLICATIONS

German Search Report (Application No. 10 2015 112 127.1) dated Jan. 31, 2019.

*Primary Examiner* — Binh C Tat
(74) *Attorney, Agent, or Firm* — Burr & Brown, PLLC (57) ABSTRACT

The invention relates to an integration device for integrating a mobile terminal device into a vehicle, which integration device comprises an electronic unit and a storage unit, the electronic unit comprising an inductive charging unit, by means of which the mobile terminal device can be charged, and the storage unit comprising a storage mat, on which the mobile terminal device can be placed.

14 Claims, 10 Drawing Sheets

(56) References Cited

U.S. PATENT DOCUMENTS

2014/0055251 A1* 2/2014 Son .................. G08C 17/02
340/12.54

FOREIGN PATENT DOCUMENTS

DE     10 2013 011 880 A1    1/2015
WO       2007/118694 A1    10/2007

* cited by examiner

INTEGRATION DEVICE

This application claims the benefit under 35 USC § 119(a)-(d) of German Application Nos. 10 2015 003 319.0 filed Mar. 17, 2015 and 10 2015 112 127.1 filed Jul. 24, 2015, the entireties of which are incorporated herein by reference.

FIELD OF THE INVENTION

The invention relates to an integration device for integrating a mobile terminal device into a vehicle.

BACKGROUND OF THE INVENTION

Known from DE 10 2013 011 880 A1 is an integration device for integrating a mobile terminal device into a vehicle, which integration device comprises an electronic unit and a storage unit, the electronic unit comprising an inductive charging unit, by means of which the mobile terminal device can be charged, and the storage unit comprising a storage mat, on which the mobile terminal device can be placed.

SUMMARY OF THE INVENTION

It is the object of the invention to propose an integration device by means of which overheating of a mobile terminal device can be prevented in a simple and effective manner and/or that can be installed in a versatile manner in the vehicle.

In the case of the integration device according to the invention for integrating a mobile terminal device into a vehicle, it is provided that the storage unit comprises a cavity realized under the storage mat, the storage mat being realized as a perforated mat having openings, the openings connecting an interior of the vehicle, located above the storage mat, to the cavity, and the cavity being able to be supplied with air from an airflow provided on the vehicle, in such a manner that the air delivered by the airflow flows out through the openings into the interior of the vehicle and thereby cools the mobile terminal device that can be placed on the storage mat. By means of such an integration unit, it is possible, with minimal complexity, to effect cooling of a mobile terminal device acting in combination with the integration device, since the latter allows connection to an air supply provided on the vehicle, such that the integration device need not comprise its own airflow generating device for this purpose. Such a system is highly effective, since it allows the mobile telephone to be supplied with cool external air and/or with air cooled by an air-conditioning system of the vehicle. Less effective cooling, by means of an airflow generated from the air present in the vehicle interior, is thereby avoided.

It is also provided to realize the storage mat with a structured upper side, flow channels being formed, as a result of a spatial structuring between the upper side of the storage mat and the mobile terminal device placed on the storage mat, through which the air under the mobile terminal device flows out into the interior of the vehicle. This prevents unwanted closing of the openings and ensures an airflow around the entire back side of the mobile terminal device.

Furthermore, it is provided to equip the integration device with at least one connection opening through which the airflow realized on the vehicle can be introduced into the integration device, and furthermore to equip the integration device with at least one connection opening through which an electrical connection realized on the vehicle can be plug-connected to the integration device. This enables the integration device to be factory-fitted or retrofitted, with few manipulations, into a vehicle.

In respect of the electronic unit, it is provided to equip the latter with a printed circuit board, in addition to an inductive charging unit, the printed circuit board comprising at least one electrical connection, the electrical connection or connections being realized, in particular, as an antenna connection and/or electric power supply connection and/or data line connection. Such a structure of the electronic unit also simplifies installation of the integration device in a vehicle.

Furthermore, it is provided to equip the electronic unit with a receiving tray, the connection opening or the connection openings for the electrical connection realized on the vehicle being realized either on a left transverse side wall of the tray or on a right transverse side wall of the tray or on a right longitudinal side wall of the tray or on left longitudinal side wall of the tray or on at least two of the side walls of the tray, and the printed circuit board being matched, in particular in its symmetry, to a receiving space of the tray in such a manner that the printed circuit board can be inserted in the receiving space in various orientations in such a manner that the printed circuit board, when in the mounted state, corresponds to the connection opening or the connection openings in such a manner that an electrical connection realized on the vehicle, or a plurality of electrical connections realized on the vehicle, can be connected, through the tray, to the electrical connection, or the electrical connections, of the printed circuit board. Such a matching of the printed circuit board and tray enables the printed circuit board to be inserted in a differing orientation in the tray. If the tray is matched with its connection openings to a desired orientation of the printed circuit board, is thereby possible, with minimal complexity, to provide an integration device matched to differing installation situations, such that the integration device can be matched, with minimal complexity, to, for example, connection openings supplied from the left or right.

It is also provided to equip the electronic unit, not only with the inductive charging unit and the first printed circuit board, but also with a second printed circuit board, the first printed circuit board comprising those electronic components that are necessary for connecting the integration device to the vehicle, and in particular to a vehicle bus, the second printed circuit board comprising those components that are necessary for operating a charging coil of the charging unit, and the charging unit also comprising, in particular, optional electronic components that support specific functions of mobile terminal devices. This provides the integration device with added value in comparison with conventional integration devices that serve only for charging.

Furthermore, it is provided to equip the electronic unit with a fan, the charging coil of the charging unit and/or the first printed circuit board and/or second printed circuit board being able to be cooled by the fan. Additionally equipping the integration device with an additional fan makes it possible to adhere to the temperature limits of the electronic components built into the integration device, independently of a cooling of the mobile terminal device. Thus, for example, cooling can also be realized even if the vehicle is not in operation.

It is also provided to equip the electronic unit of the integration device with a coupling antenna for coupling the mobile terminal device, the coupling antenna being disposed between the charging coil of the charging unit and the storage mat, the coupling antenna being realized, in particular, in the shape of a ring, and the electronic unit also comprising, in particular, an NFC tile and/or a shielding realized, in particular, within the ring-shaped coupling antenna. Such an arrangement ensures that the integration device is of a compact structure that is protected against interference.

In respect of the structure of the storage unit, it is provided that the latter comprises vertical elements, the vertical elements being disposed in the cavity, the vertical elements being realized in such a manner that the air of the airflow that flows into the cavity is deflected in the direction of the openings of the storage mat, the vertical elements being realized, in particular, as stumps, in particular as polygonal, and in particular hexagonal, pyramids, the stumps tapering, in particular, in the direction of the openings of the storage mat. Such bodies can be easily realized and demolded, e.g. by an injection molding process. Furthermore, these bodies are also able to support, over a large area, forces that are introduced via the storage mat.

It is also provided to equip the storage unit with an under-plate, the cavity located under the storage mat being delimited downwardly by the under-plate. This enables the cavity to be sealed downwardly in an effective manner by very simple means.

Furthermore, it is provided to realize the vertical elements on the storage mat and/or on the under-plate, the vertical elements projecting into the cavity in the direction of the under-plate or in the direction of the storage mat, a height of the cavity, in particular, being determined by the vertical elements. Since it is of such a two-part or one-part design, the integration device itself is also easily constructed, and can therefore be mounted rapidly. In particular, such a structure also allows rapid substitution of the components, or easy cleaning of the components.

It is also provided that the storage unit comprises a lattice structure, the lattice structure being disposed between the storage mat and the under-plate and comprising the vertical elements, a height of the cavity, in particular, being determined by the vertical elements of the lattice structure. Such a structure offers the advantage, for example, that the lattice structure can be substituted in order to adjust the height of the cavity, or that, in the case of soiling, the lattice structure can be substituted by a new lattice structure, without the necessity of replacing further components.

Furthermore, it is provided to distribute the vertical elements in the cavity in such a manner that the airflow supplied laterally and consequently parallel to the surface of the storage mat, irrespective of whether supplied laterally from the left or right or from the front or back, is opposed in the projection by a closed row of cones, such that an unimpeded flow of the air through the cavity is avoided. With such a design, the vertical elements, irrespective of the direction from which they receive airflow, exhibit a commensurate effect.

In the case of the integration device according to the invention, the electronic unit comprises a receiving tray, a connection opening or a plurality of connection openings for an electrical connection realized on the vehicle being realized either on a left transverse side wall of the tray or on a right transverse side wall of the tray or on a right longitudinal side wall of the tray or on left longitudinal side wall of the tray or on at least two of the side walls of the tray or and a printed circuit board that can be installed in the tray being matched, in particular in its symmetry, to a receiving space of the tray in such a manner that the printed circuit board can be inserted in the receiving space in various orientations in such a manner that the printed circuit board, when in the mounted state, corresponds to the connection opening or the connection openings in such a manner that an electrical connection realized on the vehicle, or a plurality of electrical connections realized on the vehicle, can be connected, through the tray, to an electrical connection, or a plurality of electrical connections, of the printed circuit board. Such a matching of the printed circuit board and tray enables the printed circuit board to be inserted in a differing orientation in the tray. If the tray is matched with its connection openings to a desired orientation of the printed circuit board, it is thereby possible, with minimal complexity, to provide an integration device matched to differing installation situations, such that the integration device can be matched, with minimal complexity, to, for example, connection openings supplied from the left or right.

Furthermore, it is provided to provide the first printed circuit board, in a top view onto its printed conductors, with such a geometrical shape that the latter can be rotated in 90° steps about a rotation axis that is perpendicular to the printed conductors and in this is always congruent in relation to its other 90° positions, the printed circuit board being realized either, in particular, as an even-numbered polygon, and in particular being square or in particular circular, the integration device also additionally comprising, in particular, the features of at least one of the embodiments discussed above. Such matching of the components to one another ensures an equally compact structure of the integration device in all assembly combinations.

Finally, it is provided to insert the integration device in a console, in particular a central console of the vehicle, the central console forming a rim surrounding the storage unit, a storage mat transitioning via an upper side, in a flush manner or via a raised step, into the surrounding rim. Such a design enables the integration device to be optimally integrated into the central console.

BRIEF DESCRIPTION OF THE DRAWINGS

Further details of the invention are described in the drawing on the basis of schematically represented exemplary embodiments.

DETAILED DESCRIPTION OF THE INVENTION

Figure 1:
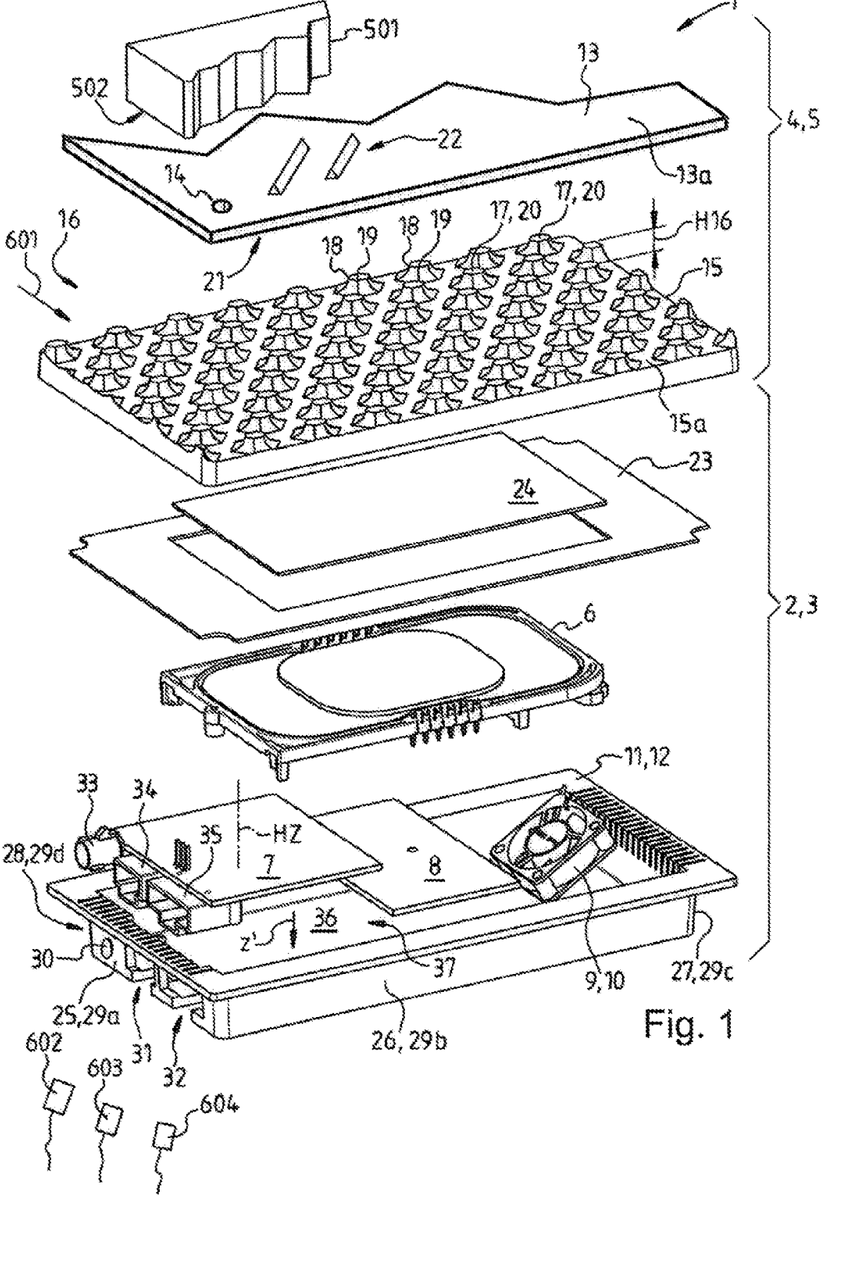
FIG. 1 is an exploded representation of an integration device according to the present invention.
Figure 2:
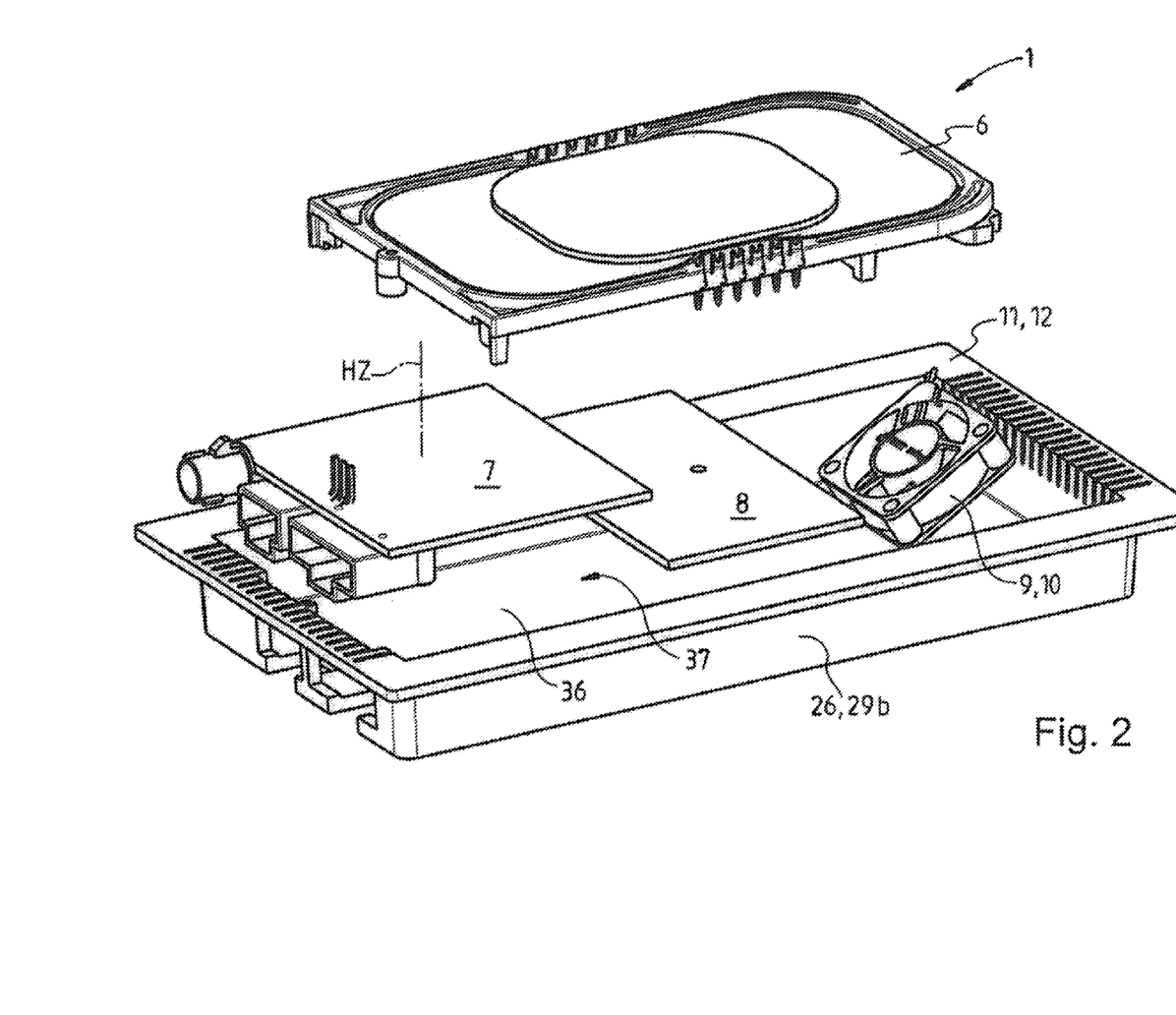
FIG. 2 is an enlarged representation of a part of FIG. 1.
Figure 3:
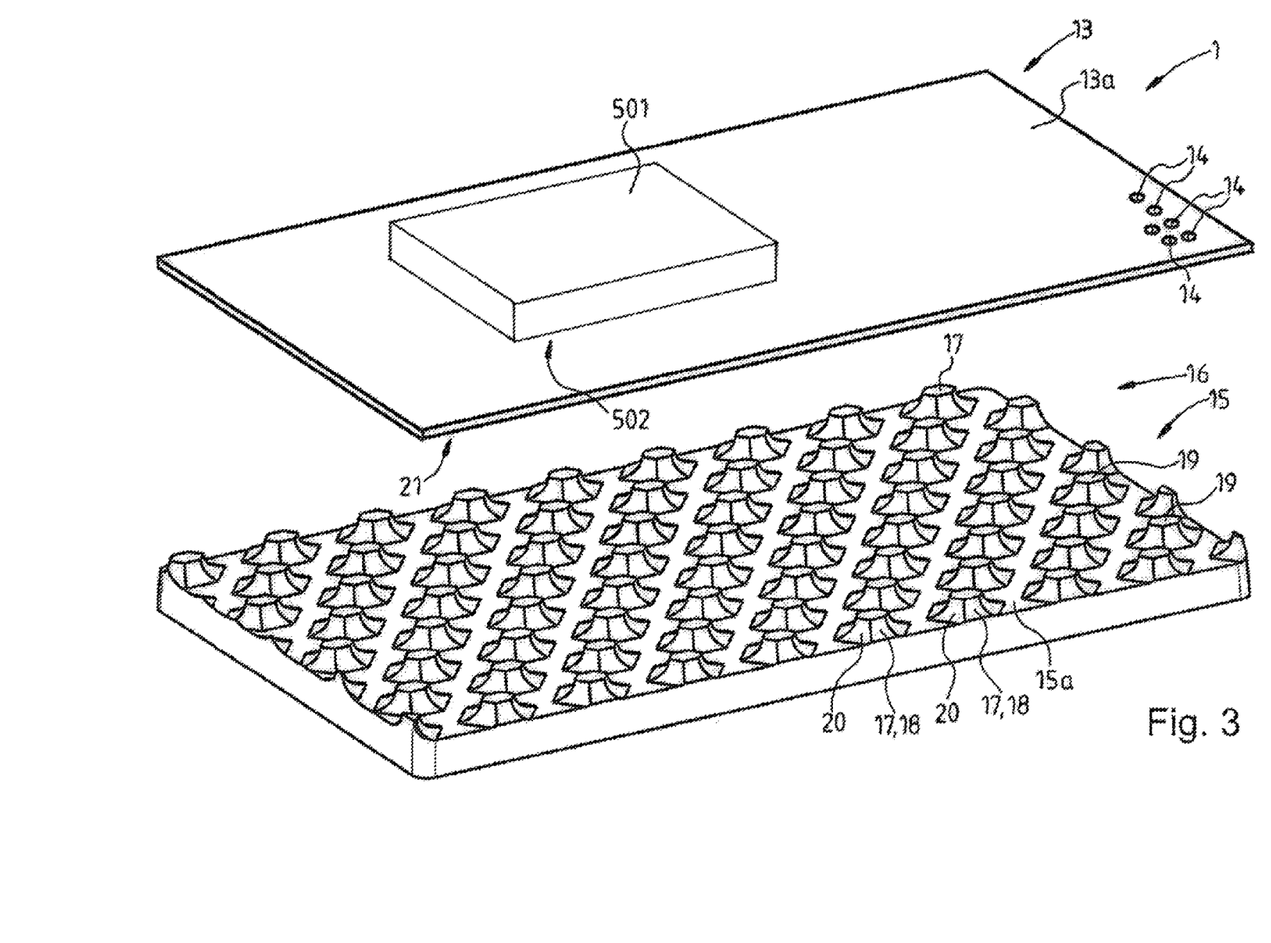
FIG. 3 is an enlarged and completed representation of a further part of FIG. 1.

In FIG. 1 there is an exploded representation of a first integration device 1 according to the present invention. The integration device 1 comprises an electronic unit 2, which forms a bottom part 3. Furthermore, the integration device 1 comprises a storage unit 4, which forms an upper part 5. FIGS. 2 and 3 each show parts of FIG. 1, in an enlarged view.

The electronic unit 2 comprises an inductive charging unit 6, for wireless charging of a mobile terminal device realized as a mobile telephone 501. Furthermore, the electronic unit 2 comprises a first printed circuit board 7, a second printed circuit board 8, a fan 9 realized as an electric ventilator 10, and a tray, or receiving tray 11, that forms a receiving case 12 for the aforementioned components.

The storage unit 4 comprises a perforated storage mat 13, on the surface or upper side 13a of which the mobile telephone 501 can be placed. A multiplicity of holes or openings 14 form the perforation of the storage mat 13, the openings 14, which form flow channels, being shown only exemplarily in FIGS. 1 and 3. Preferably, the openings 14 are made in the storage mat 13 in a symmetrical pattern. The storage unit 4 additionally comprises an under-plate 15 that is disposed under the storage mat 13, a cavity 16 being realized between the storage mat 13 and the under-plate 15, even when in the assembled state. A height H16 of the cavity 16 is defined by a multiplicity of vertical elements 17, which are realized on an upper side 15a of the under-plate 15 that faces toward the storage mat 13. The storage mat 13, which is realized as a PU mat, lies on top of these vertical elements 17. The vertical elements 17 are realized as stumps 18 of hexagonal pyramids, which support the storage mat 13 with their cut faces 19. For the purpose of cooling the mobile telephone 501, it is provided to introduce into the cavity 16, laterally between the storage mat 13 and the under-plate 15, an airflow 601 that is provided on the vehicle. The air of the airflow 601 is routed by the vertical elements 17, which form knobs 20, against an underside 21 of the storage mat 13, and is thereby also routed to the openings 14, such that the air flows out of the integration device 1 through the openings 14, realized as through-holes, and is routed to where the mobile telephone 501 lies on the storage mat 13, and against the back side 502 of the mobile telephone. The upper side 13a of the storage mat 13 has a structure 22, represented schematically in FIG. 1, that is formed by protuberances and/or depressions and/or a corrugated shape, and which prevents the mobile telephone 501 from completely closing some of the openings 14 with its back side 502.

The electronic unit 2 additionally comprises a coupling antenna 23 and an NFC tile 24. These are both disposed beneath the under-plate 15, the coupling antenna 23 being realized in a manner similar to a ring and surrounding the NFC tile 24.

Figure 7A:
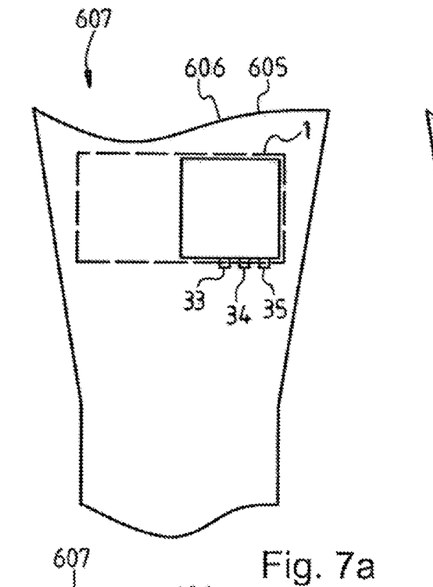
FIGS. 7a to 7f are six mounting variants for transverse mounting of the first integration device, shown in FIGS. 1 to 3, into a vehicle console realized as a central console.

The tray 11 comprises four side walls 25, 26, 27, 28, the side wall 25, as a transverse side wall, forming a left transverse side 29a, the side wall 26, as a longitudinal side wall, forming a right longitudinal side 29b, the side wall 27, as a transverse side wall, forming a right transverse side 29c, and the side wall 28, as a longitudinal side wall, forming a left longitudinal side 29d. Realized in the left transverse side 29a are three connection openings 30, 31 and 32. The latter are provided in order that the electrical connections 33, 34 and 35 disposed on the first printed circuit board 7 are accessible from the side when the first printed circuit board 7 is accommodated in the tray 11. The printed circuit board 7 assumes its mounted position when taken out of the position shown in FIG. 7, in an arrow direction z' in the direction of a base 36, into a receiving space 37 of the tray 11. When in this mounted position, the printed circuit board 7, or its connections 33, 34 and 35, can then be contacted by vehicle electrical connections 602, 603 and 604 that are lead-in from the vehicle.

According to an embodiment variant that is not represented, further connection openings are provided on the tray, these connection openings being positioned in such a manner that the first printed circuit board, when rotated by 90° to the right or left about a vertical axis HZ that is perpendicular to the printed circuit board 7, can likewise be contacted by the electrical connections 602, 603 and 604 that are led-in from the vehicle.

According to the exemplary embodiment represented, it is provided to produce the tray 11, in respect of the positioning of its connection openings, by means of a variable tool, such that the connection openings are disposed on the side wall on which these connection openings are required.

Figure 6A:
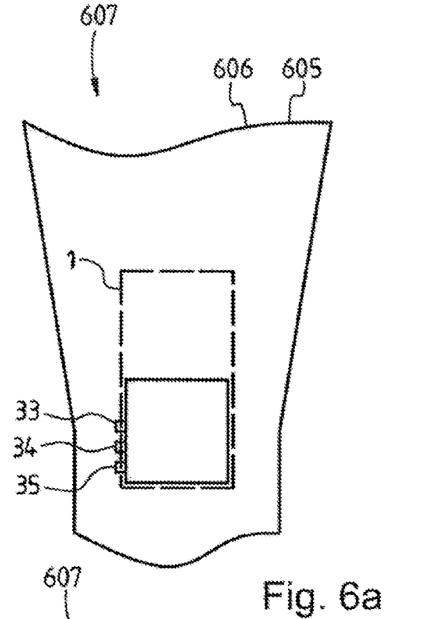
FIGS. 6a to 6f are six mounting variants for longitudinal mounting of the first integration device, shown in FIGS. 1 to 3, into a vehicle console realized as a central console.
Figure 6B:
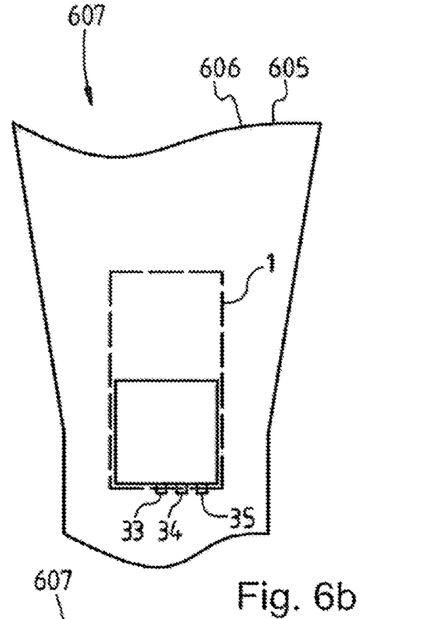
Figure 6C:
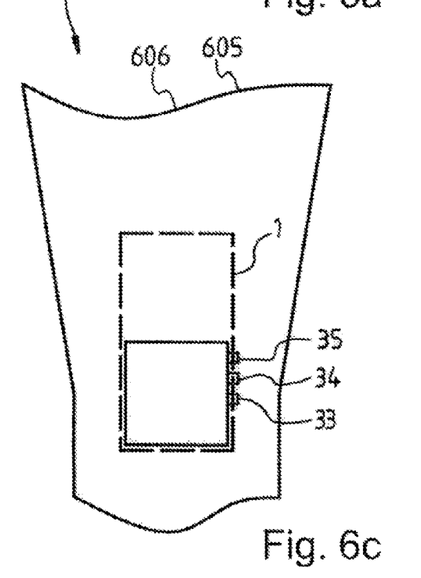
Figure 6D:
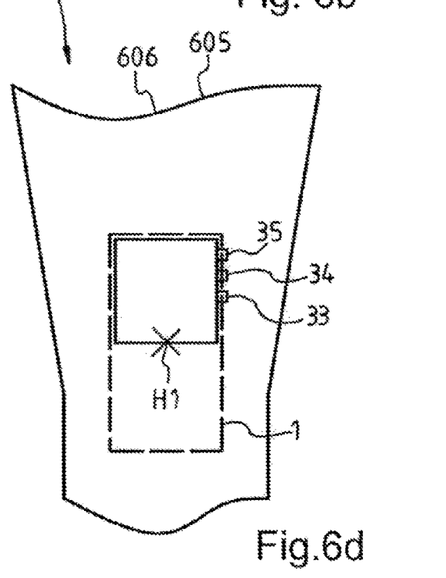
Figure 6E:
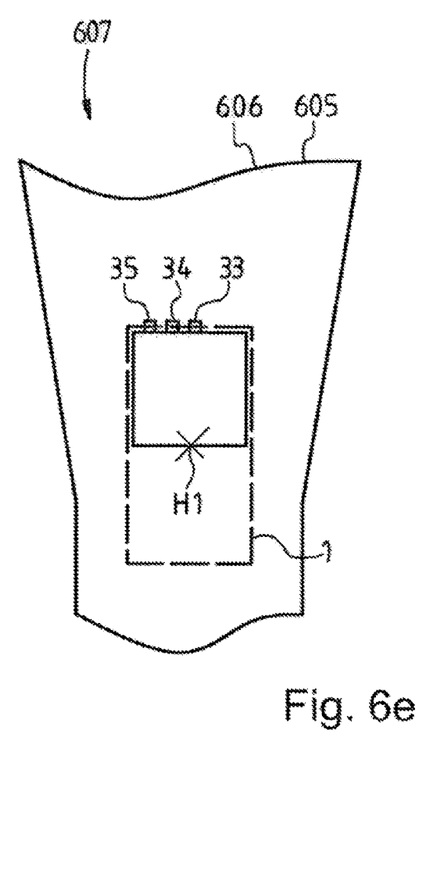
Figure 6F:
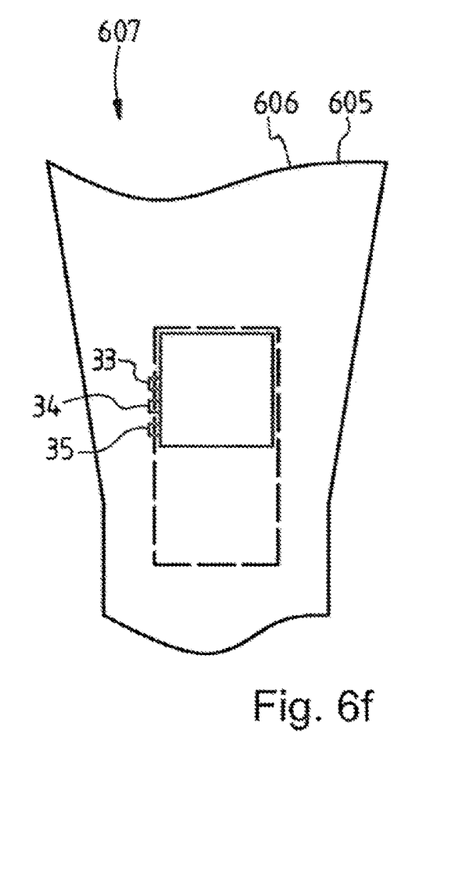
Figure 7B:
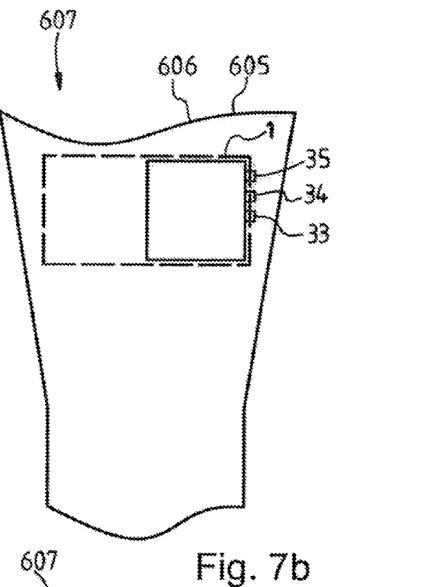
Figure 7C:
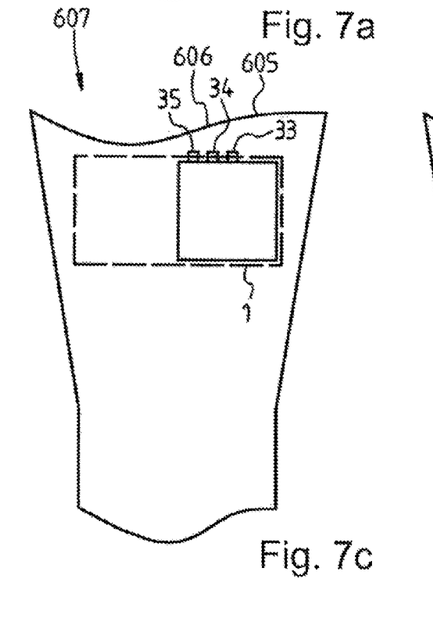
Figure 7D:
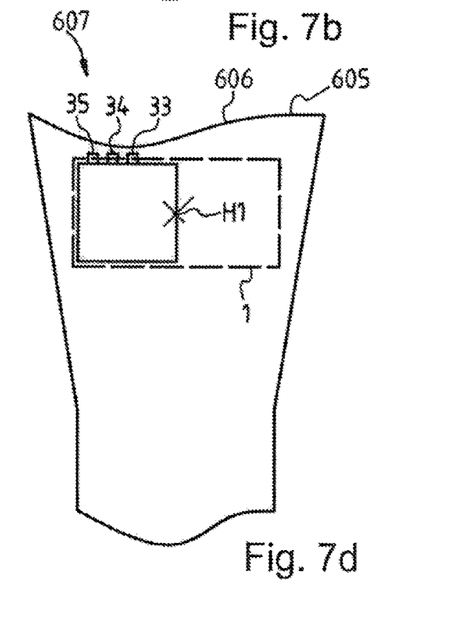
Figure 7E:
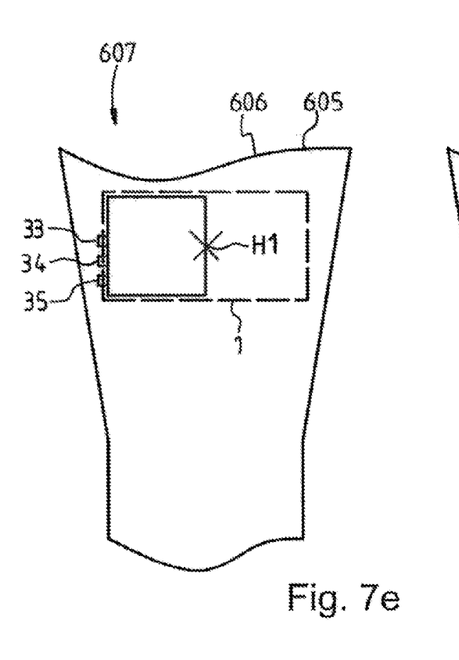
Figure 7F:
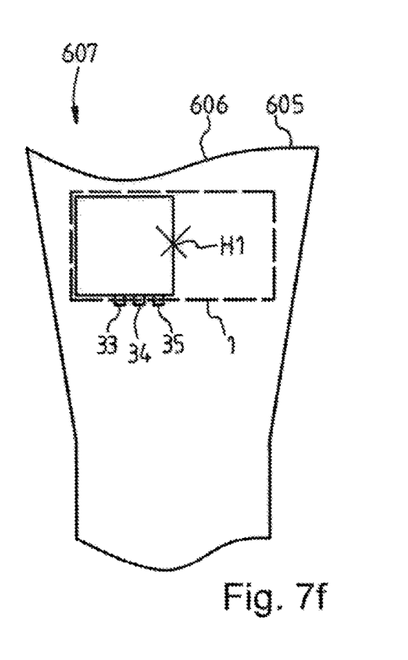

It is explained in FIGS. 6a to 6c and 7a to 7c how, by differing insertion of the first printed circuit board 7, its connections 33, 34 and 35 can be oriented in differing ways, in the case of a longitudinal mounting of the integration device 1 shown in FIGS. 6a to 6c, and in the case of a transverse mounting of the integration device 1 shown in FIGS. 7a to 7c, into a console 606 of a vehicle 607 that is realized as a central console 605. It is thereby possible for the integration device 1 to be adapted in a flexible manner to a great variety of connection situations in differing vehicle models. FIGS. 6d to 6f and 7d to 7f show further connection possibilities that ensue if the entire integration device 1 is rotated by 180° about its vertical axis H1.

Figure 4:
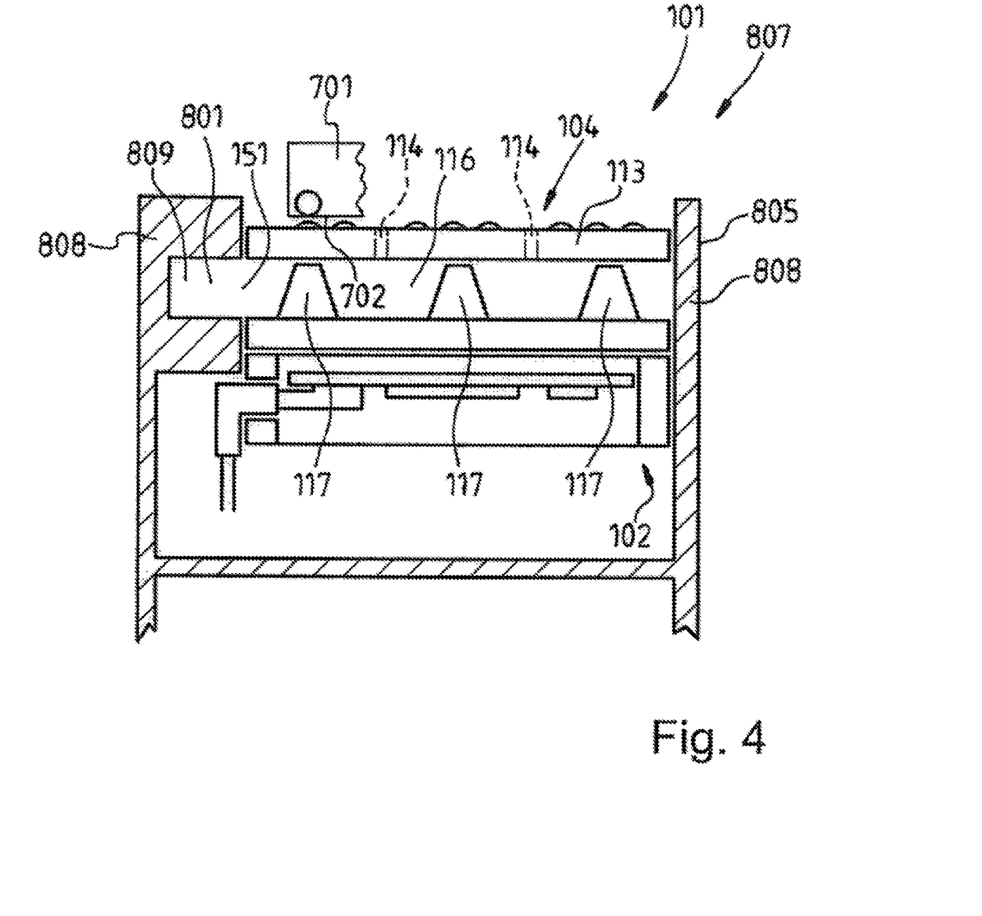
FIG. 4 is a schematic sectional representation through a console of a vehicle, in which a further integration device according to the invention is installed.

Shown schematically in section in FIG. 4 is an embodiment variant of an integration device 101 according to the invention, the integration device 101 having basically the same structure as the integration device shown in FIGS. 1 to 3. The integration device 101 is already built into a central console 805 of a vehicle 807, side walls 808 of the central console 805 being represented by hatching. A channel 809, through which an airflow 801 provided on the vehicle is routed to the integration device 101, is realized in the central console 805. The integration device 101 is realized such that the channel 809 goes to a connection opening 151 of a storage unit 104 of the integration device 101, and air of the airflow 801 flows into a cavity 116 between a storage mat 113 and an under-plate 115, is routed there by vertical elements 117 in the direction of the storage mat 113, and through openings 114 realized in the storage mat 113, into a vehicle interior, or interior 810, and also flows against a back side 702 of a mobile telephone 701 in order to cool this back side, in particular when the mobile telephone heats up as a result of the wireless charging. FIG. 4 also shows how an electronic unit 102 is contacted by the vehicle 807.

Figure 5:
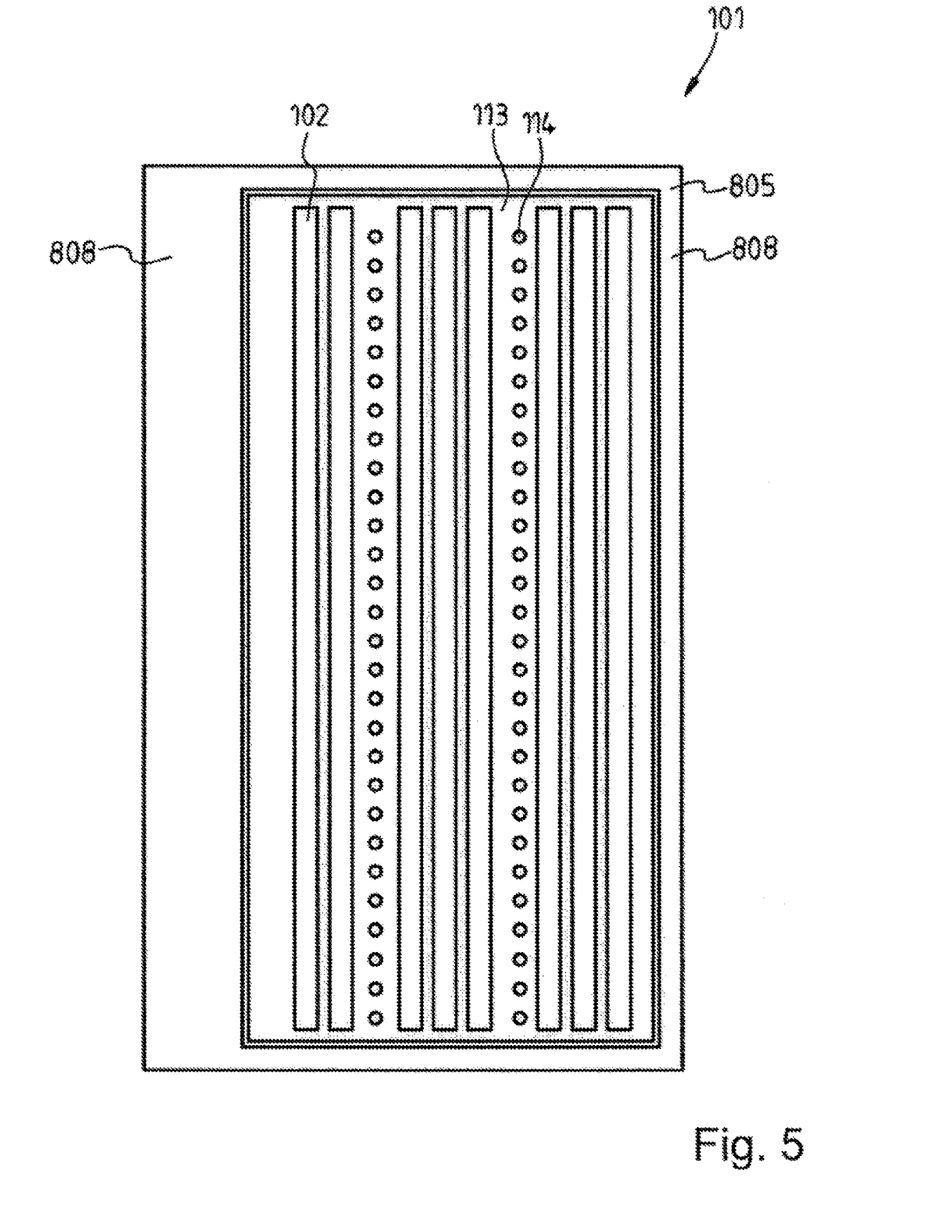
FIG. 5 is a schematic representation of a top view of FIG. 4.

FIG. 5 shows a top view of the representation of FIG. 4, the arrangement of the openings 114 and a structure 122 of the storage mat 113 being understood to be merely schematic representations. The mobile telephone is not shown in FIG. 5.

Figure 8:
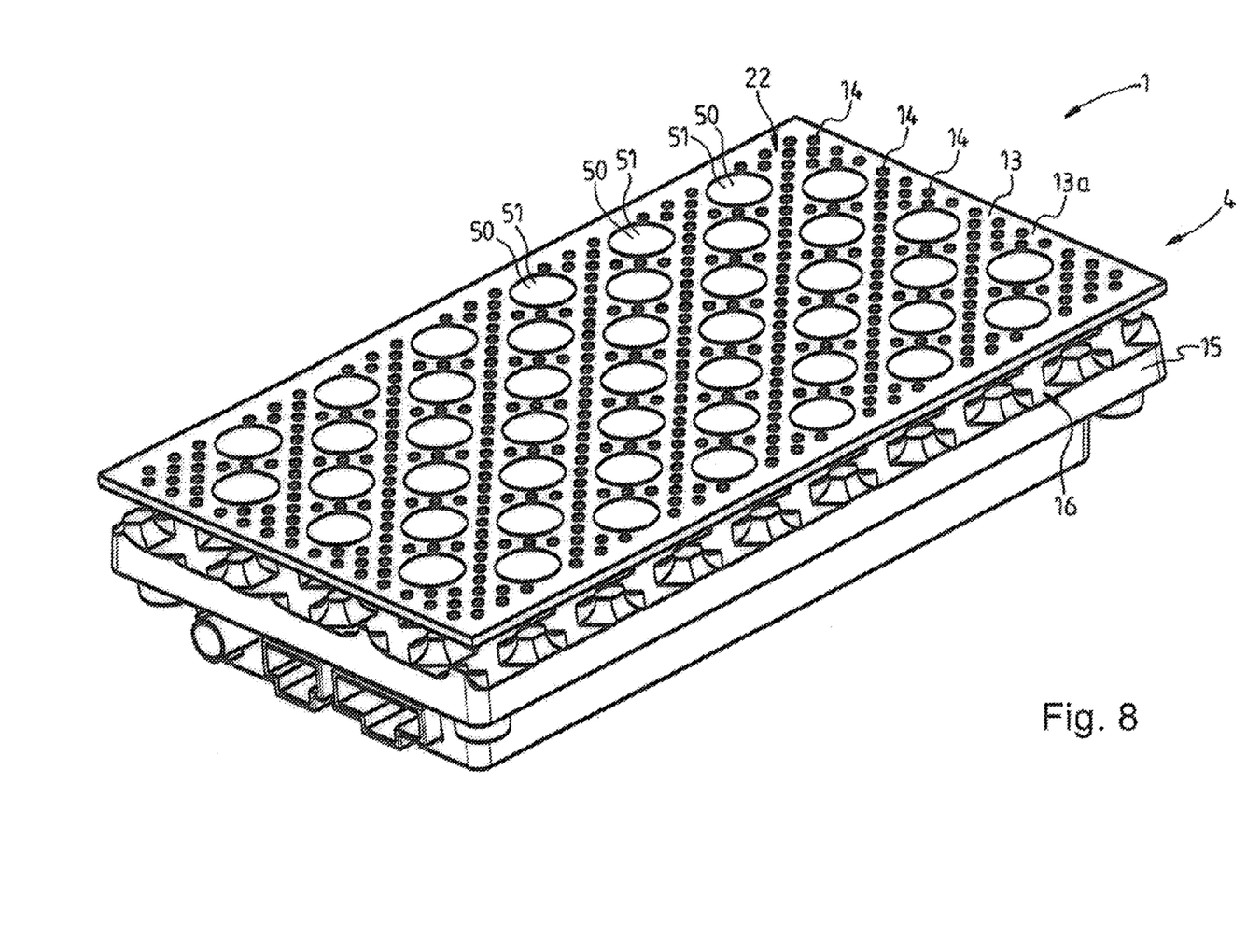
FIG. 8 is a perspective view of the integration device shown in FIG. 1 in the assembled state, the storage mat being shown in a concretized design.

Shown in FIG. 8 is a perspective view of the integration device 1 shown in FIG. 1, in the assembled state, the storage mat 13 being depicted, not in a purely schematic representation as in FIG. 1, but in a concretized design. The storage unit 4 comprises the perforated storage mat 13, on the upper side 13a of which a mobile telephone, not represented here, can be placed. The perforation of the storage mat 13 is formed by a multiplicity of openings 14. The storage unit 4 additionally comprises the mentioned under-plate 15, which is disposed under the storage mat 13, the mentioned cavity 16 also being realized between the storage mat 13 and the under-plate 15. The upper side 13a of the storage mat 13 has a structure 22 that is characterized by protuberances 50 in the form of spherical segments. The mobile telephone, not represented, lies on top of domes 51 of these protuberances 50, without closing the openings 14, and is thus cooled by the air emerging from the openings 14.

LIST OF REFERENCES 1 integration device
2 electronic unit
3 bottom part
4 storage unit
5 top part
6 charging unit
7 first printed circuit board
8 second printed circuit board
8 fan
10 electric ventilator
11 tray/receiving tray
12 receiving case
13 storage mat
13a upper side or surface of 13
14 opening/flow channel
15 under-plate
15a upper side of 15
16 cavity
17 vertical element
18 stump
19 cut face of 17
20 knob
21 underside of 13
22 structure on the upper side of 13
23 coupling antenna
24 NFC tile
25-28 side wall or transverse side wall or longitudinal side wall
29a left transverse side formed by side wall 25
29b right longitudinal side formed by side wall 26
29c right transverse side formed by side wall 27
29d left longitudinal side formed by side wall 28
30-32 connection openings in 29 on 7 electrical
33-35 connection
36 base of 11
37 receiving space of 11
50 protuberance
51 dome
101 integration device
102 electronic unit
104 storage unit
113 storage mat
114 opening
115 under-plate
116 cavity
117 vertical element
122 structure of 113
151 connection opening
501 mobile telephone/mobile terminal device
502 back side of 501
601 airflow
602 electrical connection on vehicle
603 electrical connection on vehicle
604 electrical connection on vehicle
605 central console
606 console
607 vehicle
701 mobile telephone
702 back side
801 airflow
805 central console
807 vehicle
808 side wall
809 channel
810 interior/vehicle interior
H1 vertical axis of 1
HZ vertical axis of 7
H16 height of 16
z' spatial direction

The invention claimed is:

1. An integration device, for integrating a mobile terminal device into a vehicle, comprising:
an electronic unit and a storage unit, the electronic unit comprising an inductive charging unit, by means of which the mobile terminal device can be charged, and
the storage unit comprising a storage mat, on which the mobile terminal device can be placed, wherein the storage unit comprises a cavity under the storage mat,
the storage mat is a perforated mat having openings, that connect an interior of the vehicle, located above the storage mat, to the cavity, and
the cavity is supplied with air from an airflow provided on the vehicle, in such a manner that the air delivered by the airflow flows out through the openings into the interior of the vehicle and thereby cools the mobile terminal device that can be placed on the storage mat,
wherein the electronic unit further comprises a first printed circuit board, and a receiving tray, the first printed circuit board comprising at least one electrical connection selected from an antenna connection, an electric power supply connection, and a data line connection,
wherein connection openings for an electrical connection of the vehicle are on one or more of a left transverse side wall of the tray, a right transverse side wall of the tray, a right longitudinal side wall of the tray, and a left longitudinal side wall of the tray, the first printed circuit board is matched, in its symmetry, to a receiving space of the tray in such a manner that the first printed circuit board can be inserted in the receiving space in various orientations in such a manner that the first printed circuit board, when received in the tray, corresponds to the connection openings in such a manner that at least one electrical connection of the vehicle can be connected through the tray to the at least one electrical connection of the first printed circuit board.

2. The integration device according to claim 1, wherein the storage mat has a structured upper side in which flow channels are formed, between the upper side of the storage mat and the mobile terminal device placed on the storage mat, through which the air under the mobile terminal device flows out into the interior of the vehicle.

3. The integration device according to claim 1, wherein the integration device comprises at least one connection opening through which the airflow from the vehicle can be introduced into the integration device, and the integration device comprises at least one connection opening through which an electrical connection of the vehicle can be plug-connected to the integration device.

4. The integration device according to claim 1, wherein the electronic unit comprises a second printed circuit board, in addition to the inductive charging unit and the first printed circuit board, the first printed circuit board comprising those electronic components that are necessary for connecting the integration device to the vehicle, and in particular to a vehicle bus, and the second printed circuit board comprising those components that are necessary for operating a charging coil of the inductive charging unit, and the inductive charging unit also comprising electronic components that support specific functions of mobile terminal devices.

5. The integration device according to claim 4, wherein the electronic unit comprises a fan for cooling at least one of the charging coil of the inductive charging unit, the first printed circuit board, and the second printed circuit board.

6. The integration device according to claim 4, wherein the electronic unit comprises a coupling antenna for coupling the mobile terminal device, the coupling antenna being disposed between the charging coil of the inductive charging unit and the storage mat, the coupling antenna being in the shape of a ring, and the electronic unit also comprising at least one of an NFC tile and a shielding within the ring-shaped coupling antenna.

7. The integration device according to claim 1, wherein the storage unit comprises vertical elements disposed in the cavity, the vertical elements being structured to cause the air of the airflow with which the cavity is supplied to be deflected in the direction of the openings of the storage mat, the vertical elements being structured as polygons tapering in the direction of the openings of the storage mat.

8. The integration device according to claim 7, wherein the storage unit comprises an under-plate, the cavity located under the storage mat being delimited downwardly by the under-plate.

9. The integration device according to claim 8, wherein at least one of the storage mat and under-plate comprise the vertical elements, the vertical elements projecting into the cavity in the direction of the under-plate or in the direction of the storage mat, and a height of the cavity is determined by the vertical elements.

10. The integration device according to claim 8, wherein the storage unit comprises a lattice structure disposed between the storage mat and the under-plate and comprising the vertical elements, and a height of the cavity is determined by the vertical elements of the lattice structure.

11. The integration device according to claim 7, wherein the vertical elements are distributed in the cavity in such a manner that the airflow supplied laterally and consequently parallel to the surface of the storage mat, irrespective of whether supplied laterally from the left or right or from the front or back, is opposed in the projection by a closed row of cones, such that an unimpeded flow of the air through the cavity is avoided.

12. The integration device according to claim 1, wherein the first printed circuit board, in a top view onto its printed conductors, has such a geometrical shape that it can be rotated in 90° steps about a rotation axis that is perpendicular to the printed conductors and in this is always congruent in relation to its other 90° positions, the first printed circuit board being either an even-numbered polygon or circular.

13. The integration device according to claim 1, wherein the integration device is insertable in a console of the vehicle, the console forming a rim surrounding the storage unit, with the storage mat transitioning via an upper side, in a flush manner or via a raised step, into the surrounding rim.

14. An integration device for integrating a mobile terminal device into a vehicle, comprising
an electronic unit and a storage unit, the electronic unit comprising an inductive charging unit, by means of which the mobile terminal device can be charged, and a first printed circuit board comprising at least one electrical connection selected from an antenna connection, an electric power supply connection, and a data line connection,
the storage unit comprising a storage mat, on which the mobile terminal device can be placed,
wherein the electronic unit further comprises a receiving tray,
at least one connection opening for an electrical connection of the vehicle is formed on one or more of a left transverse side wall of the tray, a right transverse side wall of the tray, a right longitudinal side wall of the tray, and a left longitudinal side wall of the tray,
the first printed circuit board that can be installed in the tray being matched, in its symmetry, to a receiving space of the tray in such a manner that the printed circuit board can be inserted in the receiving space in various orientations in such a manner that the first printed circuit board, when received in the tray, corresponds to the at least one connection opening in such a manner that the at least one electrical connection of the vehicle can be connected through the tray to the at least one electrical connection of the first printed circuit board.

* * * * *